United States Patent
Thomas et al.

(10) Patent No.: US 11,750,441 B1
(45) Date of Patent: Sep. 5, 2023

(54) PROPAGATING NODE FAILURE ERRORS TO TCP SOCKETS

(71) Applicant: Juniper Networks, Inc., Sunnyvale, CA (US)

(72) Inventors: Reji Thomas, Bangalore (IN); Harmeet Singh, Bangalore (IN); Amit Arora, Bangalore (IN); Jimmy Jose, Hosur (IN); Sairam Neelam, Hyderabad (IN); Vinod Arumugham Chettiar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 114 days.

(21) Appl. No.: 16/125,369

(22) Filed: Sep. 7, 2018

(51) Int. Cl.
*H04L 41/0677* (2022.01)
*H04L 67/145* (2022.01)
(Continued)

(52) U.S. Cl.
CPC ...... *H04L 41/0677* (2013.01); *H04L 61/5007* (2022.05); *H04L 67/145* (2013.01); *H04L 69/16* (2013.01)

(58) Field of Classification Search
CPC . H04L 61/2007; H04L 67/145; H04L 67/142; H04L 67/1034; H04L 69/16; H04L 69/40; H04L 41/0677; H04L 41/5025; H04L 41/04; H04L 41/0659; H04L 41/12; H04L 41/0663; H04L 43/103; H04L 43/10; H04L 43/0817; H04L 43/50; H04L 43/06; H04L 43/0864; H04L 43/0811; H04L 43/0847; H04L 43/0888; H04L 43/08;
(Continued)

(56) References Cited

U.S. PATENT DOCUMENTS

| | | | |
|---|---|---|---|
| 5,253,248 | A | 10/1993 | Dravida et al. |
| 5,613,136 | A | 3/1997 | Casavant et al. |
| 5,721,855 | A | 2/1998 | Hinton et al. |
| 5,826,081 | A | 10/1998 | Zolnowsky |
| 5,848,128 | A | 12/1998 | Frey |
| 5,933,601 | A | 8/1999 | Anshier et al. |
| 6,052,720 | A | 4/2000 | Traversat et al. |
| 6,101,500 | A | 8/2000 | Lau |

(Continued)

FOREIGN PATENT DOCUMENTS

| | | |
|---|---|---|
| EP | 1367750 A1 | 12/2003 |
| EP | 1816801 A1 | 8/2007 |

(Continued)

OTHER PUBLICATIONS

"A primer on Internet and TCP/IP Tools and Utilities," RFC 2151, www.research.org/rfcview/RFC/2151.html, last printed Nov. 9, 2005, 3 pp.

(Continued)

*Primary Examiner* — Un C Cho
*Assistant Examiner* — Rasha K Fayed
(74) *Attorney, Agent, or Firm* — Shumaker & Sieffert, P.A.

(57) ABSTRACT

A method and network device for detecting a TCP socket failure is described. A network device may be configured to detect a failure of a link between a first node and a second node, determine one or more transmission control protocol (TCP) sockets of a plurality of TCP sockets on the first node that are communicating over the link between the first node and the second node, write information to a TCP stack for the determined one or more TCP sockets, the information indicating that the determined one or more TCP sockets have an error, and remediate the determined one or more TCP sockets in response to the information.

17 Claims, 4 Drawing Sheets

(51) Int. Cl.
*H04L 69/16* (2022.01)
*H04L 61/5007* (2022.01)

(58) Field of Classification Search
CPC ..... H04L 47/2466; H04L 47/10; H04L 47/12;
H04L 47/14; H04L 47/33; H04L 47/263;
H04L 47/11; H04L 47/826; H04L 47/31;
H04L 47/17; H04L 47/28; H04L 45/021;
H04L 45/586; H04L 45/28; H04L 45/745;
H04L 45/14; H04L 45/58; H04L 45/04;
H04L 45/50; H04L 45/16; H04L 45/22;
H04L 45/62; H04L 45/20; H04L 45/74;
H04L 45/70; H04L 45/00; H04L 45/24;
H04L 45/245; H04L 45/60; H04L 1/1809;
H04L 63/08; H04L 12/4641; H04L
12/1877; H04L 12/26; H04L 49/101;
H04L 49/102; H04L 49/25; H04L 49/40;
H04W 28/0268; H04W 28/0289; H04W
28/02; H04W 28/22
See application file for complete search history.

(56) References Cited

U.S. PATENT DOCUMENTS

| | | | |
|---|---|---|---|
| 6,148,337 A | 11/2000 | Estberg et al. |
| 6,163,544 A | 12/2000 | Andersson et al. |
| 6,173,411 B1 | 1/2001 | Hirst et al. |
| 6,212,559 B1 | 4/2001 | Bixler et al. |
| 6,223,260 B1 | 4/2001 | Gujral et al. |
| 6,255,943 B1 | 7/2001 | Ewis et al. |
| 6,263,346 B1 | 7/2001 | Rodriquez |
| 6,272,537 B1 | 8/2001 | Kekic et al. |
| 6,304,546 B1 | 10/2001 | Natarajan et al. |
| 6,310,890 B1 | 10/2001 | Choi |
| 6,374,329 B1 | 4/2002 | McKinney et al. |
| 6,389,464 B1 | 5/2002 | Krishnamurthy et al. |
| 6,393,481 B1 | 5/2002 | Deo et al. |
| 6,405,289 B1 | 6/2002 | Arimilli et al. |
| 6,453,403 B1 | 9/2002 | Singh et al. |
| 6,453,430 B1 | 9/2002 | Singh et al. |
| 6,466,973 B2 | 10/2002 | Jaffe |
| 6,477,566 B1 | 11/2002 | Davis et al. |
| 6,477,572 B1 | 11/2002 | Elderton et al. |
| 6,480,955 B1 | 11/2002 | DeKoning et al. |
| 6,502,131 B1 | 12/2002 | Vaid et al. |
| 6,507,869 B1 | 1/2003 | Franke et al. |
| 6,510,164 B1 | 1/2003 | Ramaswamy et al. |
| 6,516,345 B1 | 2/2003 | Kracht |
| 6,529,941 B2 | 3/2003 | Haley et al. |
| 6,542,934 B1 | 4/2003 | Bader et al. |
| 6,563,800 B1 | 5/2003 | Salo et al. |
| 6,584,499 B1 | 6/2003 | Jantz et al. |
| 6,618,360 B1 | 9/2003 | Scoville et al. |
| 6,636,242 B2 | 10/2003 | Bowman-Amuah |
| 6,662,221 B1 | 12/2003 | Gonda et al. |
| 6,681,232 B1 | 1/2004 | Sistanizadeh et al. |
| 6,684,343 B1 | 1/2004 | Bouchier et al. |
| 6,725,317 B1 | 4/2004 | Bouchier et al. |
| 6,738,908 B1 | 5/2004 | Bonn et al. |
| 6,751,188 B1 | 6/2004 | Medved et al. |
| 6,757,897 B1 | 6/2004 | Shi et al. |
| 6,804,816 B1 | 10/2004 | Liu et al. |
| 6,816,897 B2 | 11/2004 | McGuire |
| 6,816,905 B1 | 11/2004 | Sheets et al. |
| 6,850,253 B1 | 2/2005 | Bazerman et al. |
| 6,910,148 B1 | 6/2005 | Ho et al. |
| 6,922,685 B2 | 7/2005 | Greene et al. |
| 6,934,745 B2 | 8/2005 | Krautkremer |
| 6,952,728 B1 | 10/2005 | Alles et al. |
| 6,982,953 B1 | 1/2006 | Swales |
| 6,983,317 B1 | 1/2006 | Bishop et al. |
| 6,990,517 B1 | 1/2006 | Bevan et al. |
| 7,024,450 B1 | 4/2006 | Deo et al. |
| 7,055,063 B2 | 5/2006 | Leymann et al. |
| 7,069,344 B2 | 6/2006 | Carolan et al. |
| 7,082,463 B1 | 7/2006 | Bradley et al. |
| 7,082,464 B2 | 7/2006 | Hasan et al. |
| 7,085,277 B1 | 8/2006 | Proulx et al. |
| 7,085,827 B2 | 8/2006 | Ishizaki et al. |
| 7,093,280 B2 | 8/2006 | Ke et al. |
| 7,099,912 B2 | 8/2006 | Ishizaki et al. |
| 7,103,647 B2 | 9/2006 | Aziz |
| 7,120,693 B2 | 10/2006 | Chang et al. |
| 7,124,289 B1 | 10/2006 | Suorsa |
| 7,130,304 B1 | 10/2006 | Aggarwal |
| 7,131,123 B2 | 10/2006 | Suorsa et al. |
| 7,139,263 B2 | 11/2006 | Miller et al. |
| 7,151,775 B1 | 12/2006 | Renwick et al. |
| 7,152,109 B2 | 12/2006 | Suorsa et al. |
| 7,161,946 B1 | 1/2007 | Jha |
| 7,184,437 B1 | 2/2007 | Cole et al. |
| 7,200,662 B2 | 4/2007 | Hasan et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,305,492 B2 | 12/2007 | Bryers et al. |
| 7,310,314 B1 | 12/2007 | Katz et al. |
| 7,310,666 B2 | 12/2007 | Benfield et al. |
| 7,313,611 B1 | 12/2007 | Jacobs et al. |
| 7,336,615 B1 | 2/2008 | Pan et al. |
| 7,359,377 B1 | 4/2008 | Kompella et al. |
| 7,362,700 B2 | 4/2008 | Frick et al. |
| 7,363,353 B2 | 4/2008 | Ganesan et al. |
| 7,379,987 B2 | 5/2008 | Ishizaki et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,463,591 B1 | 12/2008 | Kompella et al. |
| 7,471,638 B2 | 12/2008 | Torrey et al. |
| 7,487,232 B1 | 2/2009 | Matthews et al. |
| 7,499,395 B2 | 3/2009 | Rahman et al. |
| 7,506,194 B2 | 3/2009 | Appanna et al. |
| 7,508,772 B1 | 3/2009 | Ward et al. |
| 7,522,599 B1 | 4/2009 | Aggarwal et al. |
| 7,523,185 B1 | 4/2009 | Ng et al. |
| 7,539,769 B2 | 5/2009 | McGuire |
| 7,561,527 B1 | 7/2009 | Katz et al. |
| 7,606,898 B1 | 10/2009 | Hunt et al. |
| 7,609,637 B2 | 10/2009 | Doshi et al. |
| 7,639,624 B2 | 12/2009 | McGee et al. |
| 7,720,047 B1 | 5/2010 | Katz et al. |
| 7,720,061 B1 | 5/2010 | Krishnaswamy et al. |
| 7,724,677 B2 | 5/2010 | Iwami |
| 7,738,367 B1 | 6/2010 | Aggarwal et al. |
| 7,760,652 B2 | 7/2010 | Tsillas et al. |
| 7,764,599 B2 | 7/2010 | Doi et al. |
| 7,765,306 B2 | 7/2010 | Filsfils et al. |
| 7,765,328 B2 | 7/2010 | Bryers et al. |
| 7,768,939 B1 * | 8/2010 | Trivedi .................. H04L 43/10 370/252 |
| 7,813,267 B2 | 10/2010 | Tsai et al. |
| 7,852,778 B1 | 12/2010 | Kompella |
| 7,860,981 B1 | 12/2010 | Vinokour et al. |
| 7,911,938 B2 | 3/2011 | Florit et al. |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,019,835 B2 | 9/2011 | Suorsa et al. |
| 8,077,726 B1 | 12/2011 | Kumar et al. |
| 8,254,271 B1 | 8/2012 | Nadeau et al. |
| 8,266,264 B2 | 9/2012 | Hasan et al. |
| 8,339,959 B1 | 12/2012 | Moisand et al. |
| 8,370,528 B2 | 2/2013 | Bryers et al. |
| 8,488,444 B2 | 7/2013 | Filsfils et al. |
| 8,503,293 B2 | 8/2013 | Raszuk |
| 8,543,718 B2 | 9/2013 | Rahman |
| 8,645,568 B2 * | 2/2014 | Patterson ................ H04L 45/04 709/241 |
| 8,693,398 B1 | 4/2014 | Chaganti et al. |
| 8,797,886 B1 | 8/2014 | Kompella et al. |

(56) References Cited

U.S. PATENT DOCUMENTS

| | | | |
|---|---|---|---|
| 8,902,780 B1* | 12/2014 | Hegde | H04L 43/0811 |
| | | | 370/252 |
| 8,948,001 B2 | 2/2015 | Guichard et al. | |
| 8,953,460 B1 | 2/2015 | Addepalli et al. | |
| 9,258,234 B1* | 2/2016 | Addepalli | H04L 67/142 |
| 9,344,359 B1* | 5/2016 | Tiruveedhula | H04L 45/28 |
| 9,407,526 B1 | 8/2016 | Addepalli et al. | |
| 9,455,894 B1* | 9/2016 | Neelam | H04L 43/10 |
| 9,781,058 B1 | 10/2017 | Addepalli et al. | |
| 2001/0042190 A1 | 11/2001 | Tremblay et al. | |
| 2002/0007443 A1 | 1/2002 | Gharachorloo et al. | |
| 2002/0032725 A1 | 3/2002 | Araujo et al. | |
| 2002/0038339 A1 | 3/2002 | Xu | |
| 2002/0093928 A1* | 7/2002 | LoGalbo | H04L 1/0083 |
| | | | 370/336 |
| 2002/0093954 A1 | 7/2002 | Weil et al. | |
| 2002/0105972 A1 | 8/2002 | Richter et al. | |
| 2002/0120488 A1 | 8/2002 | Bril et al. | |
| 2002/0141343 A1 | 10/2002 | Bays | |
| 2002/0158900 A1 | 10/2002 | Hsieh et al. | |
| 2002/0165727 A1 | 11/2002 | Greene et al. | |
| 2002/0169975 A1 | 11/2002 | Good | |
| 2002/0191014 A1 | 12/2002 | Hsieh et al. | |
| 2002/0194497 A1 | 12/2002 | Mcguire | |
| 2002/0194584 A1 | 12/2002 | Suorsa et al. | |
| 2003/0005090 A1 | 1/2003 | Sullivan et al. | |
| 2003/0009552 A1 | 1/2003 | Benfield et al. | |
| 2003/0055933 A1 | 3/2003 | Ishizaki et al. | |
| 2003/0097428 A1 | 5/2003 | Afkhami et al. | |
| 2003/0112749 A1 | 6/2003 | Hassink et al. | |
| 2003/0123457 A1 | 7/2003 | Koppol | |
| 2003/0149746 A1 | 8/2003 | Baldwin et al. | |
| 2004/0024869 A1 | 2/2004 | Davies | |
| 2004/0116070 A1 | 6/2004 | Fishman et al. | |
| 2004/0162061 A1* | 8/2004 | Abrol | H04L 69/161 |
| | | | 455/414.1 |
| 2005/0013310 A1 | 1/2005 | Banker et al. | |
| 2005/0021713 A1 | 1/2005 | Dugan et al. | |
| 2005/0063458 A1 | 3/2005 | Miyake et al. | |
| 2005/0083936 A1 | 4/2005 | Ma | |
| 2005/0175017 A1 | 8/2005 | Christensen et al. | |
| 2005/0195741 A1 | 9/2005 | Doshi et al. | |
| 2005/0259571 A1 | 11/2005 | Battou | |
| 2005/0259634 A1 | 11/2005 | Ross | |
| 2005/0268146 A1* | 12/2005 | Jin | G06Q 40/04 |
| | | | 714/2 |
| 2005/0281192 A1 | 12/2005 | Nadeau et al. | |
| 2006/0018266 A1 | 1/2006 | Seo | |
| 2006/0087977 A1* | 4/2006 | Tatman | H04L 45/04 |
| | | | 370/242 |
| 2006/0095538 A1 | 5/2006 | Rehman et al. | |
| 2006/0133300 A1 | 6/2006 | Lee et al. | |
| 2006/0233107 A1 | 10/2006 | Croak et al. | |
| 2006/0239201 A1 | 10/2006 | Metzger et al. | |
| 2006/0262772 A1 | 11/2006 | Guichard et al. | |
| 2006/0285500 A1 | 12/2006 | Booth et al. | |
| 2007/0014231 A1 | 1/2007 | Sivakumar et al. | |
| 2007/0018104 A1 | 1/2007 | Parvin et al. | |
| 2007/0021132 A1 | 1/2007 | Jin et al. | |
| 2007/0041554 A1 | 2/2007 | Newman et al. | |
| 2007/0061103 A1 | 3/2007 | Patzschke et al. | |
| 2007/0147281 A1 | 6/2007 | Dale et al. | |
| 2007/0165515 A1 | 7/2007 | Vasseur | |
| 2007/0180104 A1 | 8/2007 | Filsfils et al. | |
| 2007/0180105 A1 | 8/2007 | Filsfils et al. | |
| 2007/0207591 A1 | 9/2007 | Rahman et al. | |
| 2007/0220252 A1 | 9/2007 | Sinko | |
| 2007/0233822 A1* | 10/2007 | Farmer | H04L 69/16 |
| | | | 709/220 |
| 2007/0263836 A1 | 11/2007 | Huang | |
| 2007/0280102 A1 | 12/2007 | Vasseur et al. | |
| 2008/0004782 A1 | 1/2008 | Kobayashi et al. | |
| 2008/0025226 A1* | 1/2008 | Mogul | H04L 43/50 |
| | | | 370/242 |
| 2008/0034120 A1 | 2/2008 | Oyadomari et al. | |
| 2008/0044181 A1* | 2/2008 | Sindhu | H04J 14/0267 |
| | | | 398/49 |
| 2008/0049622 A1 | 2/2008 | Previdi et al. | |
| 2008/0074997 A1 | 3/2008 | Bryant et al. | |
| 2008/0163291 A1 | 7/2008 | Fishman et al. | |
| 2008/0225731 A1 | 9/2008 | Mori et al. | |
| 2008/0247324 A1* | 10/2008 | Nadeau | H04L 45/02 |
| | | | 370/245 |
| 2008/0253295 A1 | 10/2008 | Yumoto et al. | |
| 2008/0285472 A1* | 11/2008 | Abdulla | H04L 41/0668 |
| | | | 370/250 |
| 2009/0016213 A1* | 1/2009 | Lichtwald | H04L 63/1458 |
| | | | 370/225 |
| 2009/0019141 A1 | 1/2009 | Bush et al. | |
| 2009/0046579 A1* | 2/2009 | Lu | H04L 45/02 |
| | | | 370/225 |
| 2009/0046723 A1 | 2/2009 | Rahman et al. | |
| 2009/0157882 A1* | 6/2009 | Kashyap | H04L 67/1001 |
| | | | 709/227 |
| 2009/0201799 A1 | 8/2009 | Lundstrom et al. | |
| 2009/0225650 A1 | 9/2009 | Vasseur | |
| 2009/0232029 A1* | 9/2009 | Abu-Hamdeh | H04L 41/0803 |
| | | | 370/255 |
| 2009/0279440 A1* | 11/2009 | Wong | H04L 43/0823 |
| | | | 370/242 |
| 2010/0299319 A1 | 11/2010 | Parson et al. | |
| 2011/0019550 A1* | 1/2011 | Bryers | H04L 47/125 |
| | | | 370/235 |
| 2011/0063973 A1* | 3/2011 | VenkataRaman | H04L 43/0817 |
| | | | 370/228 |
| 2011/0170408 A1 | 7/2011 | Furbeck et al. | |
| 2012/0008506 A1* | 1/2012 | Astigarraga | H04L 41/0677 |
| | | | 370/242 |
| 2013/0028099 A1* | 1/2013 | Birajdar | H04L 45/28 |
| | | | 370/242 |
| 2013/0060838 A1* | 3/2013 | Yaffe | G06F 9/5027 |
| | | | 709/203 |
| 2013/0064102 A1* | 3/2013 | Chang | H04L 45/245 |
| | | | 370/244 |
| 2013/0086144 A1 | 4/2013 | Wu | |
| 2013/0185767 A1 | 7/2013 | Tirupachur Comerica et al. | |
| 2013/0332767 A1* | 12/2013 | Fox | H04L 67/025 |
| | | | 714/4.3 |
| 2013/0336191 A1* | 12/2013 | Zhao | H04L 45/16 |
| | | | 370/312 |
| 2014/0056121 A1* | 2/2014 | Johnsen | H04L 41/0654 |
| | | | 370/216 |
| 2014/0149819 A1* | 5/2014 | Lu | H04L 45/745 |
| | | | 714/748 |
| 2014/0310391 A1* | 10/2014 | Sorenson, III | H04L 43/0817 |
| | | | 709/223 |
| 2015/0063117 A1* | 3/2015 | DiBurro | H04L 41/5025 |
| | | | 370/236 |
| 2015/0312387 A1* | 10/2015 | Merino Vazquez | |
| | | | H04L 65/1046 |
| | | | 370/216 |
| 2016/0050102 A1* | 2/2016 | Natarajan | H04L 43/0811 |
| | | | 370/242 |
| 2016/0192403 A1* | 6/2016 | Gupta | H04W 36/14 |
| | | | 455/411 |
| 2016/0241430 A1* | 8/2016 | Yadav | H04L 43/0811 |
| 2017/0310764 A1* | 10/2017 | Touitou | H04L 67/06 |

FOREIGN PATENT DOCUMENTS

| | | |
|---|---|---|
| EP | 1861963 A2 | 12/2007 |
| EP | 1864449 A2 | 12/2007 |
| EP | 1891526 A2 | 2/2008 |
| WO | 2006104604 A2 | 10/2006 |

OTHER PUBLICATIONS

"ActiveXperts Ping backgrounds (PING is part of the ActiveSocket Toolkit)," ActiveSocket Network Communication Toolkit 2.4,

(56) References Cited

OTHER PUBLICATIONS

Activexperts, www.activexQerts.com/activsocket/toolkits/ning. html, last printed Nov. 10, 2005, 3 pp.
"Configure the loopback Interface," www.juniper.net/techpubs/software/iunos/junos56/index.html, Last printed Nov. 7, 2005, 2 pp.
"DARPA Internet Program Protocol Specification," Transmission Control Protocol, RFC 793, Sep. 1981, 90 pp.
"ICMP (Internet Control Message Protocol)," Data Network Resource, www.rhyshaden.com/icmp.html, last printed Nov. 10, 2005, 4 pp.
"Traceroute," Webopedia, http://www.webopedia.com/TERM/T/traceroute.html, Aug. 26, 2004, 1 p.
"Configure an Unnumbered Interface," www.juniper.net/tech,nubs/software/junos/junos56/index.html, last printed Nov. 7, 2005, 1 p.
"Using the IP unnumbered configuration FAQ," APNIC, https://www.apnic.net/get-ip/faqs/ip-unnumbered, Jul. 1, 2005, 2 pp.
Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.
Aggarwal, "OAM Mechanisms in MPLS Layer 2 Transport Networks," IEEE Communications Magazine, Oct. 2004, pp. 124-130.
Atlas, "ICMP Extensions for Unnumbered Interfaces," draft-atlas-icmp-unnumbered-01, Feb. 2006, 8 pp.
Atlas, "ICMP Extensions for Unnumbered Interfaces," draft-atlas-icmp-unnumbered -00, Dec. 9, 2005, 8 pp.
Berkowitz, "Router Renumbering Guide," Network Working Group, RFC 2072, Jan. 1997, 41 pp.
Bhatia et al. "Bidirectional Forwarding Detection (BFD) on Link Aggregation Group (LAG) Interfaces" Internet Engineering Task Force (IETF), RFC 7130, Feb. 2014, 11 pp.
Boney, "Cisco IOS in a Nutshell," 2nd Edition, published Aug. 2005, 16 pp.
Bonica et al., "Generic Tunnel Tracing Protocol (GTTP) Specification," draft-bonica- tunproto-OI.txt, IETF Standard-Working-Draft, Internet Engineering Task Force, Jul. 2001, 20 pp.
Chen et al., "Dynamic Capability for BGP- 4," Network Working Group, Internet Draft, draft-ietf-idr-dynamic-cap-03.txt, Dec. 2002, 6 pp.
Fairhurst, Gorry, "Internet Control Message protocol," Internet Control Protocol, (ICMP), www.erg.abdn.ac.uk/users/gorry/course/inet-nages/icmp.html, last printed Sep. 6, 2006, 3 pp.
H3C S3610 & S5510 Series Ethernet Switches (Version: 20081229-C-1.01, Release 5303, 2006-2008, Command Manual-BFD-GR), 2008, 13 pp.
Harmon, William "32-Bit Bus Master Ethernet Interface for the 68030 (Using the Macintosh SE/30)," Apr. 1993, 10 pp.
Hedge et al., "Multipoint BFD for MPLS," Network Working Group, Internet-Draft, draft-chandra-hedge-mpoint-bfd-for-mpls-00 txt, Mar. 2012, 12 pp.
IEEE Std. 802.3ad-2000, "Amendment to Carrier Sense Multiple Access with Collision Detection (CSMA/CD) Access Method and Physical Layer Specifications—Aggregation of Multiple Link Segments," Mar. 30, 2000, 182 pp.
Katz et al. "Bidirectional Forwarding Detection (BFD)" Internet Engineering Task Force (IETF), RFC 5880, Jun. 2010, 49 pp.
Katz et al. "Bidirectional Forwarding Detection (BFD) for IPv4 and IPv6 (Single Hop)" Internet Engineering Task Force (IETF), RFC 5881, Jun. 2010, 7 pp.
Katz et al., "Generic Application of Bidirectional Forwarding Detection (BFD)," Internet Engineering Task Force (IETF), RFC 5882, Juniper Networks, Jun. 2010, 15 pp.
Katz et al., "Biderectional Forwarding Detection (BFD) for Multihop Paths," Internet Engineering Task Force (IETF), RFC 5883, Juniper Networks, Jun. 2010, 6 pp.
Katz et al., "BFD for Multipoint Networks," Network Working Group, Internet Draft, draft-ietf-bfd-multipoint-00.txt, Oct. 2011, 29 pp.
Kolon, "BFD spots router forwarding failures," Network World, www.networkworld.com/news/tech/2005/030705techugdate.html, Mar. 7, 2005, 3 pp.
Kompella et al., "Detecting Multi-Protocol Label Switched (MPLS) Data Plane Failures," Network Working Group, RFC 4379, Cisco Systems, Inc., Feb. 2006, 50 pp.
Kompella et al., Signalling Unnumbered Links in Resource ReSerVation Protocol-Traffic Engineering (RSVP-TE), Network Working Group, RFC 3477, Jan. 2003, 8 pp.
Mannie, "Generalized Multi-Protocol Label Switching Architecture," Network Working Group, Internet draft, draft-ietf-ccamp-gmpls-architecture-07.txt, May 2003, 56 pp.
Muller, "Managing Service Level Agreements," International Journal of Network Management, John Wiley & Sons, Ltd., May 1999, vol. 9, Issue 3, pp. 155-166.
Nadeau et al., "Bidirectional Forwarding Detection (BFD) for the Pseudowire Virtual Circuit Connectivity Verification (VCCV)," Internet Engineering Task Force (IETF), RFC 5885, Cisco Systems, Inc., Jun. 2010, 11 pp.
Nichols, et al., "Definition of the Differentiated Services Field (DS Field) in the IPv4 and IPv6 Headers," Network Working Group, RFC 2474, Dec. 1998, 19 pp.
Papavassilion, "Network and service management for wide-area electronic commerce networks," International Journal of Network Management, John Wiley & Sons, Ltd., Mar. 2001, vol. 11, Issue 2, pp. 75-90.
Ramakrishnan et al., "The Addition of Explicit Congestion Notification (ECN) to IP," RFC 3168, Network Working Group, Sep. 2001, 63 pp.
Sangli et al., "Graceful Restart Mechanism for BGP," Network Working Group, Internet Draft, draft-ietf-idr-restart-06.txt, httn://toolsietf.ort/html/draft-ietf-idr-restart-06, Jan. 2003, 10 pp.
Saxena et al., Detecting Data-Plane Failures in Point-to-Multipoint Mpls -Extensions to LSP Ping, Internet Engineering Task Force (IETF) RFC 6425, Nov. 2011, 28 pp.
Schmidt, Douglas C., "A Family of Design Patterns For Flexibly Configuring Network Services in Distributed Systems," Proceedings of the Third International Conference on Configurable Distributed Systems, May 6-8, 1996, IEEE Press, pp. 124-135.
Sun Hai-feng, "Advanced TCP Port Scan and it's Response," O.L. Automation 2005, vol. 24, No. 4, China Academic Electronic Publishing House, Apr. 24, 2005, 2 pp. (Abstract only).
Troutman, "DP83916EB-AT: High Performance AT Compatible Bus Master Ethernet Adapter Card," National Semiconductor Corporation, Nov. 1992, 34 pp.
Mukhi et al., "Internet Control Message Protocol ICMP," www.vijaymukhi.com/vmis/icmp, last visited Sep. 6, 2006, 5 pp.
Zvon, RFC 2072, [Router Renumbering Guide]—Router Identifiers, Chapter 8.3, Unnumbered Interfaces, www.zvon.org/tmRFC/RFC2072/output/chapter8.html , last printed on Nov. 7, 2005, 2 pp.
U.S. Appl. No. 15/989,961, Juniper Networks, Inc., (Inventors: Ganeriwal et al.), filed May 25, 2018.
Katz et al., "Bidirectional Forwarding Detection (BFD)," Internet Engineering Task Force (IETF), RFC 5880, Jun. 2010, 50pp.
Katz et al., "Bidirectional Forwarding Detection (BFD) for IPv4 and IPv6 (Single Hop)," Internet Engineering Task Force (IETF), RFC 5881, Jun. 2010, 8pp.

* cited by examiner

PROPAGATING NODE FAILURE ERRORS TO TCP SOCKETS

TECHNICAL FIELD

This disclosure relates to computer networks, and more particularly, to devices and techniques for detecting failures in multi-node systems.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table. A router uses interface cards (IFCs) for receiving and sending data packets via network links. These IFCs are installed in ports known as interfaces and are configured using interface configurations.

One way to meet increasing bandwidth needs is to use multi-chassis devices, such as routers or switches that have multiple nodes or blades, which may be located in a single rack or in multiple racks. A multi-chassis-router, for example, is a router in which multiple physical routing nodes that form the router are coupled, e.g., by high-speed Ethernet or other internal communication links, and configured to operate as a single router. That is, the multi-chassis (multi-node) router appears as a single routing device to all other devices operating in the network. A multi-chassis router is one example a multi-node system. In one particular example, a multi-chassis router includes multiple line card chassis (LCCs), which include one or more IFCs for sending and receiving packets. Each LCC may maintain a routing information base (e.g., route table) and be considered a single node. The multi-chassis router may also include one or more central switch card chassis (SCCs), which communicates with peer routers and operates a master routing information base so as to provide top-down management of the LCCs. Each SCC may also be considered a single node. In general, SCCs may form the control plane, while the LCCs from the forwarding plane.

The nodes of a multi-chassis router are often configured to run applications and processes that communicate with other nodes of a multi-chassis router. In some examples, the applications and/or processes may communicate using transmission control protocol (TCP) sockets across the internal high-speed communication link(s). Typically, TCP sockets are one-to-one connections defined by an internal network address assigned to a local node (e.g., Internet protocol (IP) address) and port number) and an internal network address of another node. The nodes (e.g., the operating system of the nodes) may execute a TCP stack that processes communications over the TCP socket using a particular protocol (in this example, TCP). In general, a TCP socket may be defined by a so-called "5-tuple." The 5-tuple includes five pieces of information that defines the connection and how it should be executed. The elements of a 5-tuple include a source (e.g., a local node) IP address, a source port number, a destination (e.g., a destination node) IP address, a destination port number, and a protocol (e.g., TCP).

In the event an individual application executing on a node fails (application-level failure) within a multi-node device, timely failover or error handling procedures are often initiated to ensure minimal impact on network operations. As such, the applications executing on nodes often run TCP keep-alive protocols within the TCP sockets to determine periodically test the responsiveness of the peer application executing on the other end of the socket within the multi-chassis device. For example, the TCP socket may send TCP keep-alive probe packets from the local node to the destination node at a set time interval. The destination node sends a reply to the keep-alive probe. Receipt of the reply indicates that the TCP socket, and therefore the peer application executing on the other node, is still operational. If the local node of the multi-node device does not receive a reply to the keep-alive probe within a predetermined time period, the local node may determine that connectivity via the TCP socket no longer exists and, therefore, the peer application on the destination node has likely failed. The local node may then take actions to such as promoting itself to master, failing over to a backup node. In the peer application executing on the destination node fails over to a different application (possibly on a node), the local node terminates the TCP socket connections with that node and initiates TCP connections with the new application.

Timely detection and failover in response to failure of individual applications executing on given nodes is required in order to reduce impact on network traffic. To achieve a quicker failover, some multi-node systems may use a TCP keep-alive protocol with a very short time between keep-alive probes (i.e., more granular keep-alives). However, as the complexity of multi-node system increases, the number of internal TCP sockets within between the nodes of the multi-chassis device, and therefore the number of TCP keep-alive probes transiting the internal communication links of the node, increases significantly. This increased number of TCP keep-alive probes between applications, sent at a high granularity, may contribute to an undesirable amount of high priority traffic within a multi-node system and consume significant internal resources of the multi-chassis device.

SUMMARY

In general, the disclosure describes techniques in which a multi-chassis device uses high-speed link-level keep alive protocols between nodes to detect link or node failures and automatically propagates the failure information within a kernel of the detecting node to any affected TCP sockets, thereby significantly accelerating the detection application level failures. The techniques of this disclosure may also be applicable to nodes in single-chassis devices.

For example, nodes within a multi-node device may be configured to operate high-speed link-level keep alive protocols between nodes to detect internal link or node failures within the device. Examples of link level keep-alive protocols may include a system heartbeat, the Trivial Network Protocol (TNP) developed by Juniper Networks of Sunnyvale, Calif., Bidirectional Forward Detection (BFD) protocol, etc. Such link-level heartbeat protocols are typically highly granular (e.g., run at short time intervals) and are executed at a low level, such as within an operating system of the nodes or even by the interfaces associated with the internal links.

This disclosure describes techniques where cues from these link-level heartbeat protocols (e.g., detections of a link failure between two nodes) may be propagated upward within the logical architecture of the network device (e.g., up through the operating system toward the TCP networking stack within the kernel) and used to automatically identify and mark any TCP sockets operating on the nodes that are likely affected by the link-level failure. Since the link level heartbeat protocols typically run at a high granularity (i.e., high rate/low periodicity), individual application-level failures normally relying exclusively on TCP socket keep-alives may be detected more quickly without requiring the application-level TCP socket keepalives be executed at such high rates. Therefore, the multi-node system may be configured to send TCP keep-alives probes less frequently, while still maintaining a desired response time for detecting application-level failures. As such, the amount of high priority messages traversing the internal communication links within the multi-node system may be reduced, as TCP keep-alive probes are sent less frequently, thereby reducing the resource burden associated with processing the messages.

In one example, a method includes detecting a failure of a link between a first node and a second node, wherein the first node and the second node are within a multi-node system, determining one or more TCP sockets of a plurality of TCP sockets on the first node that are communicating over the link between the first node and the second node, writing information to a TCP stack for the determined one or more TCP sockets, the information indicating that the determined one or more TCP sockets have an error, and remediating the determined one or more TCP sockets in response to the information.

In another example, a network device includes a first node that includes a primary routing processor, and a second node. The first node is configured to detect a failure of a link between the first node and the second node, determine one or more TCP sockets of a plurality of TCP sockets on the first node that are communicating over the link between the first node and the second node, write information to a TCP stack for the determined one or more TCP sockets, the information indicating that the determined one or more TCP sockets have an error, and remediate the determined one or more TCP sockets in response to the information.

In another example, this disclosure describes a computer-readable storage medium comprising instructions for causing a programmable processor to detect a failure of a link between a first node and a second node, determine one or more TCP sockets of a plurality of TCP sockets on the first node that are communicating over the link between the first node and the second node, write information to a TCP stack for the determined one or more TCP sockets, the information indicating that the determined one or more TCP sockets have an error, and remediate the determined one or more TCP sockets in response to the information.

The details of one or more examples are set forth in the accompanying drawings and the description below. Other features, objects, and advantages will be apparent from the description and drawings, and from the claims.

DETAILED DESCRIPTION

Figure 1:
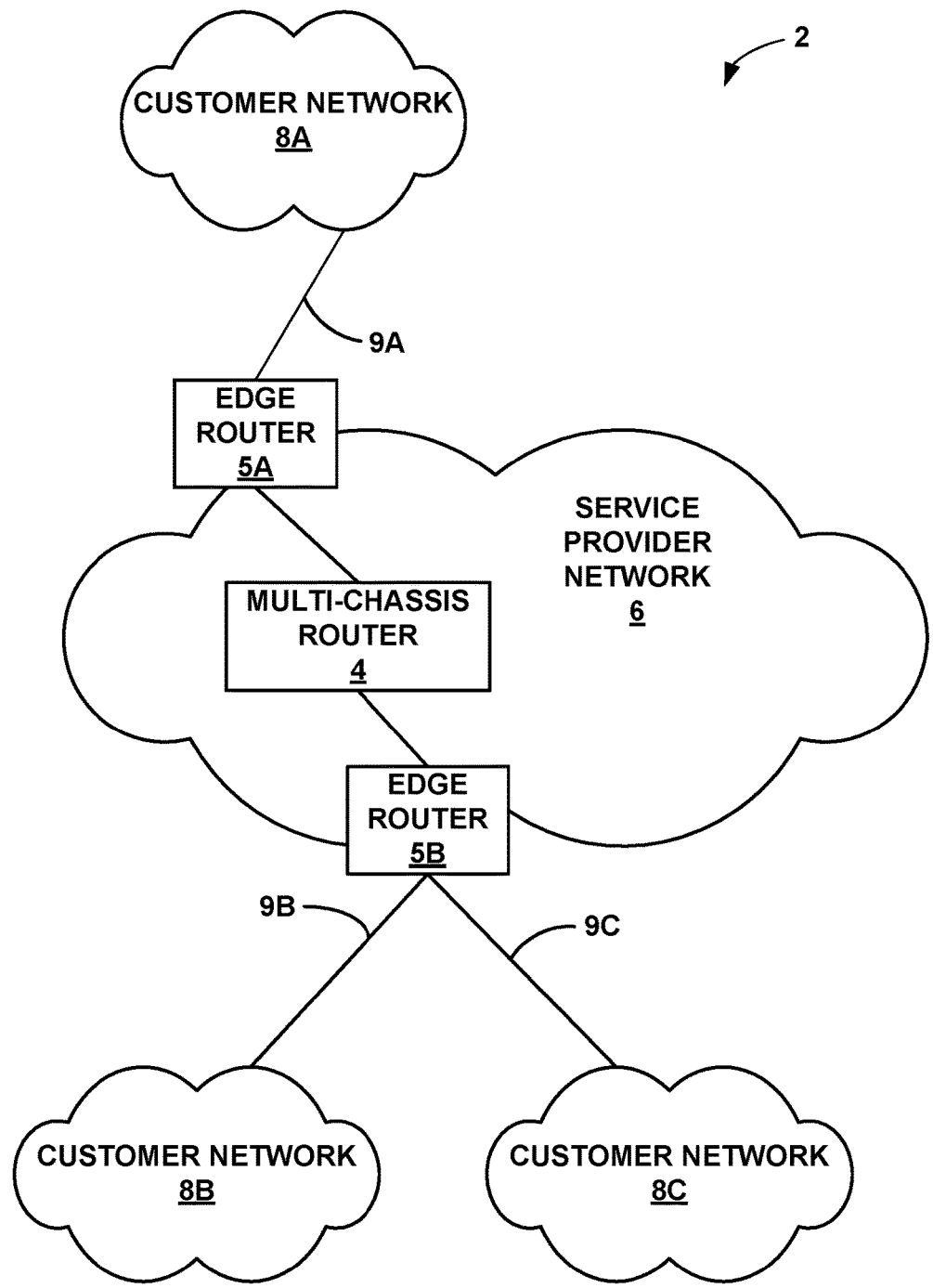
FIG. 1 is a block diagram illustrating an example computer network that includes one or more multi-chassis devices (a router in this example) that implement the techniques of this disclosure.

FIG. 1 is a block diagram illustrating an example computing environment 2 in which service provider network 6 includes a multi-chassis router 4, which generally represents a single network device having multiple nodes or blades. For purposes of example, the techniques of the disclosure are described with respect to the computing environment 2 of FIG. 1 in which multi-chassis router 4 communicates with edge routers 5A and 5B ("edge routers 5") to provide customer networks 8A-8C ("customer networks 8") with access to network 6. Multi-chassis router 4 may send periodic data, such as packets, to edge routers 5 in order to maintain an accurate representation of the topology of network 10. Multi-chassis router 4 may consist of a plurality of hierarchically arranged cooperative routing components operating as a single node within service provider network 6. In one example, multi-chassis router 4 includes one or more switch card chassis (SCCs) that operates as control nodes (e.g., a primary control node and one or more backup control nodes) and one or more line card chassis (LCCs) that operate as packet routing devices (e.g., packet routing nodes). The LCCs may contain the physical interfaces for coupling to other devices within network 6, while the SCCs control and routes traffic between the LCCs. In this sense, multi-chassis router 4 may be considered an example of a multi-node system in itself. A multi-node system may also refer to multiple devices and routers, including multi-chassis routers, single-chassis routers and edge routers.

Although not illustrated, service provider network 6 may be coupled to one or more networks administered by other providers and may thus form part of a large-scale public network infrastructure, e.g., the Internet. Consequently, customer networks 8 may be viewed as edge networks of the Internet. Service provider network 6 may provide computing devices within customer networks 8 with access to the Internet and may allow the computing devices within customer networks 8 to communicate with each other. Service provider network 6 may include a variety of network devices other than multi-chassis router 4 and edge routers 5, such as additional routers, switches, servers, or other devices.

In the illustrated example, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, or other devices. The configuration of computing environment 2 illustrated in FIG. 1 is merely exemplary. For example, service provider network 6 may be coupled to any number of customer networks 8. Nonetheless, for ease of description, only customer networks 8A-8C are illustrated in FIG. 1.

As described in more detail below, in accordance with the techniques of this disclosure, multi-chassis router 4 is configured to use a high-speed link level keep-alive protocol between nodes (e.g., internal nodes of multi-chassis router 4) to detect link or node failures and automatically propagate the failure information within a kernel of the detecting node to any affected TCP sockets, thereby significantly accelerating the detection application-level failures. While described in the context of TCP sockets, the techniques of this disclosure are applicable for use with other application level communication protocols.

The failure information from these link level keep-alive protocols may be propagated upward within the logical architecture of a node of multi-chassis router 4 (e.g., up through the operating system toward the TCP networking stack within the kernel) and used to automatically identify and mark any TCP sockets operating on the nodes that are affected by the link-level failure. Link level keep alive protocols operate from the lowest level of operating system and need not go through a TCP stack. Therefore, link level keep alive protocols are less prone to CPU resource limitations. Also, since the link level keep-alive protocols typically run at a high granularity (i.e., high rate/low periodicity), individual application-level failures normally relying exclusively on TCP socket keep-alives may be detected more quickly without requiring the application-level TCP socket keepalives to be executed at such high rates. Therefore, multi-chassis router 4 may be configured to send TCP keep-alives probes less frequently, while still maintaining a desired response time for detecting application-level failures. As such, the amount of high priority messages traversing the internal/external communication links of multi-chassis router 4 may be reduced, as TCP keep-alive probes are sent less frequently, thereby reducing the resource burden associated with processing the messages.

In one example, a node in multi-chassis router 4 may be configured to detect a failure of a link between a first node and a second node, wherein the first node and the second node are within multi-chassis router 4, determine one or more TCP sockets of a plurality of TCP sockets on the first node that are communicating over the link between the first node and the second node, write information to a TCP stack for the determined one or more TCP sockets, the information indicating that the determined one or more TCP sockets have an error, and remediate the determined one or more TCP sockets in response to the information.

The techniques of this disclosure may also be used between nodes of separate devices (e.g., between multi-chassis router 4 and edge routers 5A or 5B). A node in multi-chassis router 4 may use a link level keep-alive protocol to detect link or node failures. The node in multi-chassis router 4 may then determine any TCP sockets communicating over the affected link, and may write an error to a TCP stack for the affected TCP sockets.

Figure 2:
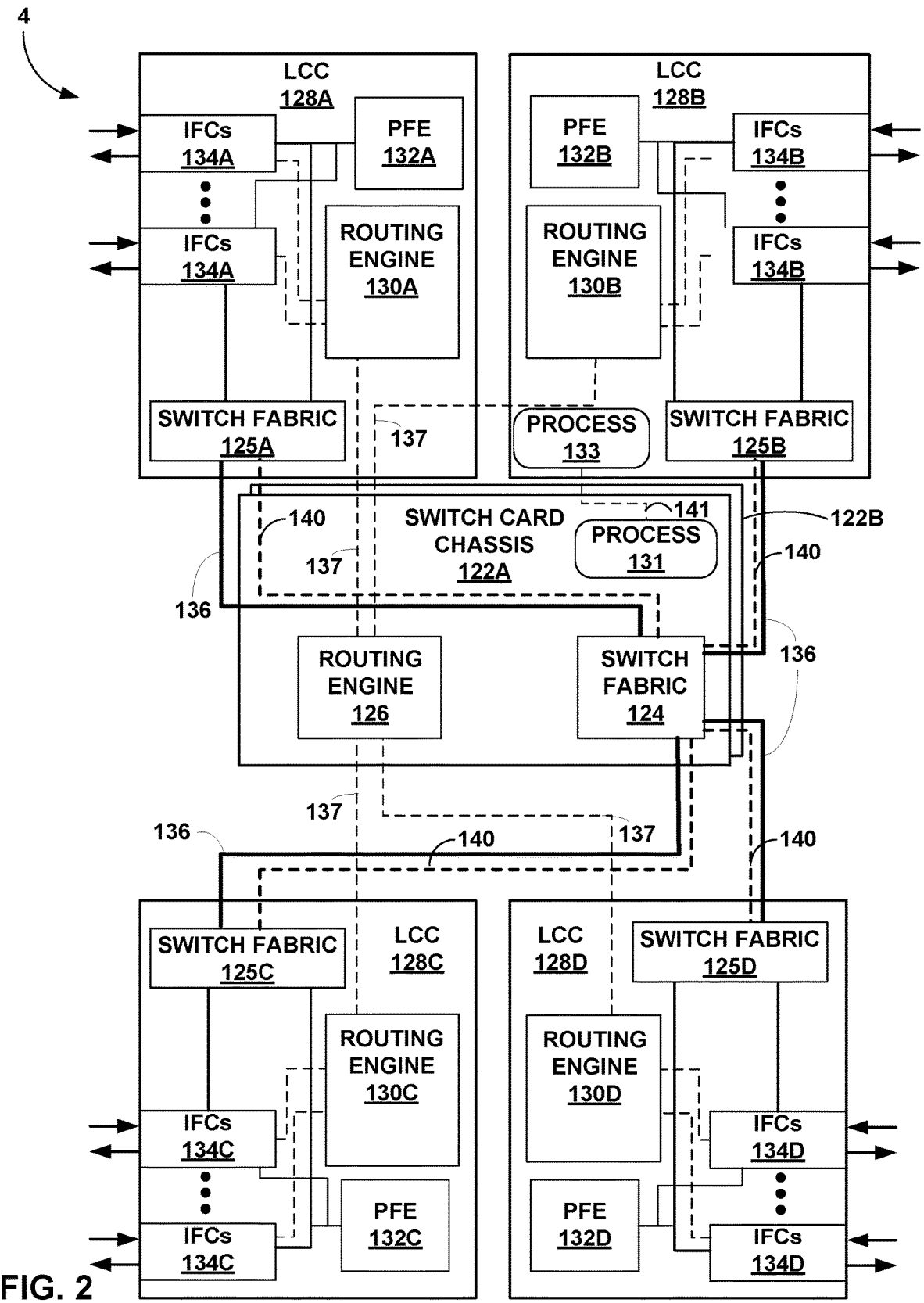
FIG. 2 is a block diagram illustrating an example multi-chassis router that may be configured to implement the techniques of this disclosure.

FIG. 2 is a block diagram illustrating an exemplary multi-chassis router 4 that operates consistent with the techniques of the disclosure. Multi-chassis router 4 routes data packets between network devices across a network. As shown in FIG. 2, multi-chassis router 4 includes a plurality of hierarchically arranged cooperative routing components. In this example, multi-chassis router 4 comprises four substantially identical LCCs 128A-128D ("LCCs 128") and an SCC 122A that operates as a central control node. Multi-chassis router 4 may also include an additional SCC 122B that may operate as a backup in case of a failure in SCC 122A. In other examples, a multi-chassis router may include more or fewer LCCs. SCC 122A provides centralized switching and control for multi-chassis router 4. LCCs 128 provide interfaces to a network using IFC sets 134A-134D ("IFCs 134").

Multi-chassis router 4 and, in particular, SCCs 122 and LCCs 128 include hardware, firmware and or software, and may include processors, control units, discrete hardware circuitry, or other logic for executing instructions fetched from computer-readable media. Examples of such media include hard disks, Flash memory, random access memory (RAM), read-only memory (ROM), non-volatile random-access memory (NVRAM), electrically erasable programmable read-only memory (EEPROM), flash memory, and the like.

SCC 122A includes switch fabric 124 and master routing engine 126. Switch fabric 124 provides a back-side connection, i.e. a connection separate from the network, between switch fabrics 125A-125D ("switch fabrics 125") of LCCs 128. Master routing engine 126 maintains routing information to describe a topology of a network. For example, the routing information may include route data that describes various routes through the network, and also next hop data indicating appropriate neighboring devices within the network for each of the routes. Master routing engine 126 periodically updates the routing information to accurately reflect the current network topology. Master routing engine 126 also uses the routing information to derive forwarding information bases (FIBs).

Master routing engine 126 controls packet forwarding throughout multi-chassis router 4 by installing a FIB (not shown) in LCCs 128 via communication with local routing engines 130A-130D ("routing engines 130") over connections 137. A FIB for one of LCCs 128 may be the same or different than a FIB for other LCCs 128 and SCC 122. Because connections 137 provide a dedicated link, i.e., separate from a data packet forwarding connection provided by connections 136, between SCC 122 and LCCs 128, FIBs in LCC routing engines 130 can be updated without interrupting packet forwarding performance of multi-chassis router 4. LCCs 128 each contain one of local routing engines 130A-130D, one of switch fabrics 125A-125D ("switch fabrics 125"), at least one packet forwarding engines (PFE) 32A-132D ("PFEs 132"), and one or more of IFC sets 134.

Multi-chassis router 4 performs routing functions in the following manner. An incoming data packet is first received from a network by one of IFCs 134, e.g., 134B, which directs it to one of PFEs 132, e.g., PFE 132B. The PFE then determines a next hop for the data packet using the FIB provided by the local routing engine, e.g., routing engine 130B. If the data packet is destined for an outbound link associated with the one of IFCs 134 that initially received the packet, the PFE forwards the packet to the outbound link. In this manner, packets may be sent out by the same PFE on which they were received from the network bypass switch fabric 124 and switch fabric 125.

Otherwise, the PFE sends the data packet to switch fabric 125, where it is directed to switch fabric 124 and ultimately is communicated to one of the other PFEs 132, e.g., PFE 132D. The receiving PFE, e.g., PFE 132D, outputs the data packet to the appropriate next hop via one of IFCs 134, e.g., IFC 134D. Thus, an incoming data packet received by one of LCCs 128 may be sent by another one of LCCs 128 to a next hop along a route to the packets ultimate destination. Other multi-chassis routers that operate in a manner consistent with the techniques of the disclosure may use different switching and routing mechanisms.

As described with respect to multi-chassis router 4 in FIG. 1, in some examples, multi-chassis router 4 may communicate with peer routing devices and/or internal nodes (e.g., SCCs and LCCs) using periodic messages in order to maintain connectivity with those devices and nodes. For example, a packet management (PPM) daemon executing on an SCC 122 of multi-chassis router 4 may generate a periodic packet using a link-level keep-alive protocol and send the packet to neighboring devices and/or nodes at a periodic interval, say once every three seconds, to indicate that the SCC 122 of multi-chassis router 4 is still operational. Examples of link level keep-alive protocols may include a system heartbeat, the Trivial Network Protocol (TNP) developed by Juniper Networks of Sunnyvale, Calif., Bidirectional Forward Detection (BFD) protocol, etc. In general, such link level heartbeat protocols are typically highly granular (e.g., run at short timer intervals) and may be use very little bandwidth.

Multi-chassis router 4 may use a link level keep-alive protocol 140 internally between each of the nodes (e.g., SCCs 122 and LCCs 128). That is, each of the nodes of multi-chassis router 4 may execute a link level keep-alive protocol 140 between the other nodes to which the particular node has a communication link (e.g., Ethernet). The link level keep-alive protocols 140 may be used to detect the failure of a node or a failure of a communication. For example, if node SCC 122A detects a failure of node LCC 128A, a routing table may be updated, and traffic may be routed to other ones of LCCs 128 (e.g., LCC 128B, LCC 128C, etc.). In addition, if a failure of SCC 122A is detected, multi-chassis router may be configured to perform a failover process so that a backup SCC (e.g., SCC 122B) may take over the control responsibilities of SCC 122A.

As one example, connectivity between two nodes (e.g., SCC 122A and LCC 128A) may go down; that is, one or more links 136 may become unavailable. A link level keep-alive protocol, such as BFD, may be used to detect a connectivity failure between two adjacent nodes, including interfaces and data links. For example, in BFD operation, nodes exchange hello packets at a specified time interval and detect a neighbor failure if no reply is received within the specified time interval. Further examples of BFD are described in Katz, D., et. al., "Bidirectional Forwarding Detection (BFD)," Request for Comments 5880, June 2010, and Katz, D., et. al., "Bidirectional Forwarding Detection (BFD) for IPv4 and IPv6 (Single Hop)," Request for Comments 5881, June 2010, the contents of each of which is incorporated by reference herein.

The nodes of multi-chassis router 4 may also be configured to perform a TCP keep-alive protocol between processes executing on the nodes. As described above, processes executing on different nodes may communicate with each other through TCP socket 141. In FIG. 2, SCC 122A is executing a process 131 and LCC 128B is executing a process 133. Of course, each of the LCCs 128 and SCCs 122 may execute processes. Process 131 may communicate with process 133 using a TCP socket 141. TCP socket 141 may execute a TCP keep-alive protocol by sending TCP keep-alive probes from SCC 122A to LCC 128B. Of course, other nodes such as routing engines 130, PFEs 132, and other nodes may also execute processes that use TCP sockets.

As will be described in more detail below, a node of multi-chassis router 4 (e.g., SCC 122A) may be configured to detect a node and/or link failure using link level keep-alive protocol 140. In response to this failure, SCC 122A may be configured to determine any TCP sockets that are communicating over the failed link or to the failed node and write an error to the TCP stack for the affected TCP socket. For example, in the example of FIG. 2, SCC 122A may detect a link failure of link 136 or a node failure of LCC 128B using link level keep-alive protocol 140. SCC 122A may then be configured to determine that process 131 uses TCP socket 141 that communicates with LCC 128B over link 136. SCC 122A may then be configured to write error information to the TCP stack for TCP socket 141. SCC 122A may then take action based on the error information written to the TCP stack.

In other examples, a node of multi-chassis router 4 may output periodic messages in accordance with different formats (e.g., using different link level keep-alive protocols) to different peers depending on the routing protocols supported by the peer and/or node. A particular node of multi-chassis router 4 may then wait for a response from each of the neighboring network devices to confirm their operational state, when using a link level keep-alive protocol between two routers (e.g., an edge router 5 and multi-chassis router 4) As described herein, SCC 122A may distribute the management of these protocol-related, periodic communications across LCCs 128 and across various components of the LCCs 128 including IFCs 134.

Figure 3:
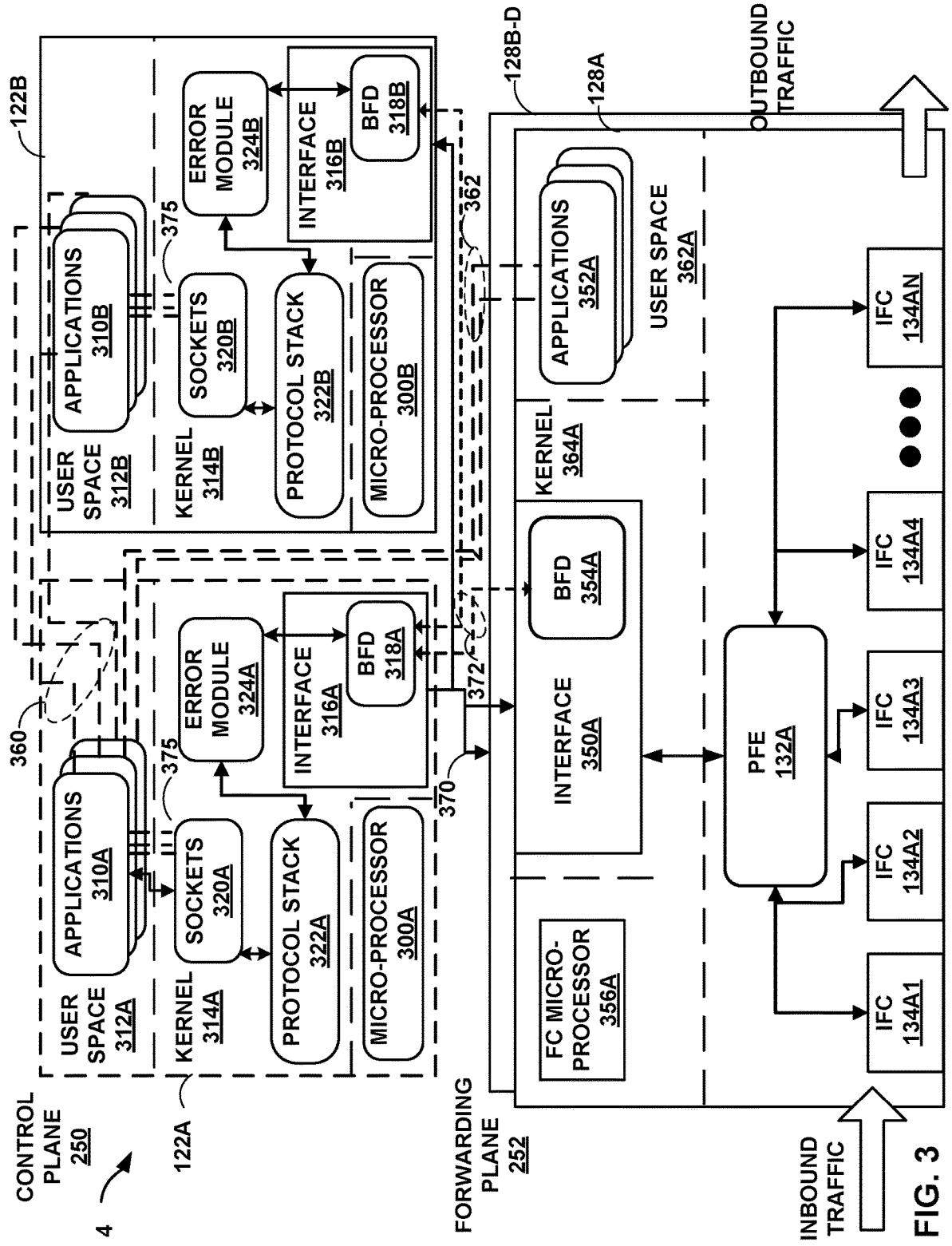
FIG. 3 is a block diagram illustrating components of the multi-chassis router in further detail, in accordance with techniques described in this disclosure.

FIG. 3 is a block diagram illustrating components of the multi-chassis router in further detail, in accordance with techniques described in this disclosure. Multi-chassis router 4 is an example of a multi-node system that may include multiple nodes in a control plane 250 (e.g., SCCs 122) and multiple nodes in a forwarding plane 252 (e.g., LCCs 128). In this example, multi-chassis router includes one or more SCCs 122 that provide control plane functionality for multi-chassis router 4. For example, SCC 122A may act as a primary routing processor and SCC 122B may act as a backup routing processor. Multi-chassis router 4 may be configured to failover the control plane functionality to SCC 122B should SCC 122A become unavailable. In this regard, control plane 250 may be distributed among multiple entities, such as one or more SCCs 122 and one or more service cards insertable into SCCs 122. In such instances, multi-chassis router 4 may therefore have multiple control planes. In some examples, each routing node (e.g., LCCs 128) of multi-chassis 4 may have its own control plane.

SCC 122A may serve as a routing component and provides control plane functions, including storing network topology in the form of routing tables, executing routing protocols to communicate with peer routing devices (e.g., SCC 122B), and maintaining and updating the routing tables. SCC 122A also provides an interface to allow user access and configuration of multi-chassis router 4. Multi-chassis router 4 also includes a plurality of forwarding components in the form LCCs 128 and a switch fabric, that together provide a forwarding plane 252 for forwarding and otherwise processing inbound and outbound subscriber traffic.

SCCs 122 are connected to each of LCCs 128 by internal communication link 370. Internal communication link 370 may comprise a 100 Mbps or 1 Gbps Ethernet connection, for example. SCCs 122 may execute applications 310A and 310B (collectively, "applications 310"). Applications 310 may also be referred to as daemons. Applications 310 are user-level processes that may run network management processes, execute routing protocols to communicate with peer routing devices, execute configuration commands received from an administrator, maintain and update one or more routing tables, manage subscriber flow processing, and/or create one or more forwarding tables for installation to LCCs 128, among other functions. Examples of applications 310 may include BFD daemons, command-line interface daemons, routing protocol daemons, and Simple Network Management Protocol daemons. In this respect, control plane 250 may provide routing plane, service plane, and management plane functionality for multi-chassis router 4. Various examples of SCCs 122 may include additional applications 310 not shown in FIG. 3 that perform other control, management, or service plane functionality and/or drive and otherwise manage forwarding plane 252 functionality for multi-chassis router 4.

As shown in FIG. 3, micro-processor 300A may execute applications 310A in user space 312A. Likewise, microprocessor 300B may execute applications 310B in user space 312B. Applications 300 operate over and interact with kernels 314A and 314B (collectively, "kernels 314"), which provide a run-time operating environment for user-level processes. Kernels 314 may comprise, for example, a UNIX operating system derivative such as Linux or Berkeley Software Distribution (BSD). Kernels 314 offers libraries and drivers by which applications 310 may interact with the underlying system.

Interface 316A and 316B (collectively "interfaces 316") of kernels 314 comprise a physical communication interfaces (e.g., Ethernet interfaces). LCCs 122 communicate over communication links 370 thought interfaces 316. that LCCs 122 communicate dedicated communication links 370. BFD daemon 318A and 318B (collectively, "BFD daemons 318") may be configured to implement the BFD protocol to detect faults between peer nodes. As shown in FIG. 3, micro-processors 300 execute BFD daemons 318 in kernels 314. In other examples, micro-processors 300 may execute BFD daemons 318 in user spaces 312. BFD daemons 318 may be configured to detect link and/or node failures between SCC 122A and SCC 122B and/or between SCC 122A and one or more of LCCs 128. BFD daemons may send link-level probes 372 between interfaces 316 of SCCs 122 and interfaces 350 of LCCs 128.

BFD is only one example of a link level keep-alive protocol that may be executed by the nodes of multi-chassis router 4. A multi-node system, such as multi-chassis router 4, may execute one or more link level keep-alive protocols between the nodes (e.g., SCCs 122 and LCCs 128). Examples of link level keep-alive protocols may include a system heartbeat, the Trivial Network Protocol (TNP) developed by Juniper Networks of Sunnyvale, Calif., BFD protocol, etc. Such link level heartbeat protocols are typically highly granular (e.g., run at short timer intervals) and light.

SCC 122A may include one or more micro-processors 300A, and SCC 122B may include one or more microprocessors 300B (collectively, "micro-processors 300"). Micro-processors 300 may be configured to execute software instructions (e.g., applications 300), such as those used to define a software or computer program, stored to a computer-readable storage medium (not shown in FIG. 3), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, SCCs 122 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

As described above, applications 310 may include an RPD daemon that executes one or more interior and/or exterior routing protocols to exchange routing information with other network devices and store received routing information in a routing information base ("RIB"). For example, an RPD daemon of applications 310 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). An RPD daemon of applications 310 may additionally, or alternatively, execute User Datagram Protocol (UDP) to send and receive data for various system resources, such as physical interfaces.

The RIB may include information defining a topology of a network, including one or more routing tables and/or link-state databases. The RPD daemon of applications 310 resolves the topology defined by routing information in the RIB to select or determine one or more active routes through the network and then installs these routes to a forwarding information base ("FIB"). Typically, the RPD daemon of applications 310 generates the FIB in the form of a radix or other lookup tree to map packet information (e.g., header information having destination information and/or a label stack) to next hops and ultimately to interface ports of interface cards associated with respective LCCs 128. Kernels 314 may synchronize FIB of SCCs 122 with forwarding information of LCCs 128.

A CLI daemon of applications 310 may provide a shell by which an administrator or other management entity or user may modify the configuration of multi-chassis router 4 using text-based commands. An SNMP daemon of applications 310 may include an SNMP agent that receives SNMP commands from a management entity to set and retrieve configuration and management information for multi-chassis router. Using CLI daemons and SNMP daemons, for example, management entities may enable/disable and configure services, manage classifications and class of service for packet flows, install routes, enable/disable and configure rate limiters, configure traffic bearers for mobile networks, enable/disable an aggregated interface (e.g., abstract fabric interface), and configure interfaces, for example. RPD daemons, CLI daemons, and SNMP daemons of applications 310, in this example, configure forwarding plane 252 via FC interfaces 316 to implement configured services, and/or add/modify/delete routes. FC interfaces 316 allows applications 310 to drive the installation and configuration of session master node and session standby nodes of LCCs 128. In particular, FC interfaces 316 may include an application programming interface (API) by which applications 310 may synchronize session parameters (e.g., BFD session parameters) to session standby nodes.

In some examples, applications 310A may communicate between nodes using a transmission control protocol (TCP) socket. Typically, TCP sockets are one-to-one connections defined by the address of a local node (e.g., Internet protocol (IP) address) and port number) and the address of another node. A node may execute a TCP stack that processes communications over the TCP socket using a particular protocol (in this example, TCP). In general, a TCP socket may be defined by a so-called "5-tuple." The 5-tuple includes five pieces of information that defines the connection and how it should be executed. The elements of a 5-tuple include a source (e.g., a local node) IP address, a source port number, a destination (e.g., a destination node) IP address, a destination port number, and a protocol (e.g., TCP).

A TCP socket may execute a TCP keep-alive protocol to determine in the TCP socket is operational. For example, TCP sockets 320 may send TCP keep-alive probe packets 375 from the local node (e.g., SCC 122A) to the destination node (e.g., SCC 122B) at a set time interval. The destination node sends a reply to the keep-alive probe. Receipt of the reply indicates that the TCP socket is still operational. If the local node does not receive a reply to the keep-alive probe within a predetermined time period, the local node may determine that the TCP socket has failed. The local node may then take actions to remediate that TCP socket, including terminating the TCP socket, restarting the TCP socket, or failing over to a backup node. The backup node may restart and/or maintain the process executed by the local node over a different TCP socket.

On multi-node systems, such as multi-chassis router 4, nodes within the router may execute processes between nodes using TCP socket connections. In the event of a node and/or TCP socket failure, timely termination/repair of these connections may be important. For example, in cases where these a multi-node system supports failover between nodes (e.g., failover from a primary control plane node (SCC 122A) to a backup control plane node (SCC 122B)), the TCP sockets are beneficially terminated and reconnected to the current active node (e.g., the backup control plane node) in a short amount of time. To achieve a quicker failover, some multi-node systems may use a TCP keep-alive protocol with a very short time between keep-alive probes (i.e., more granular keep-alives). As the number of nodes in a multi-node system increases, the number of TCP sockets and TCP keep-alive probes may increase exponentially. This increased number of TCP keep-alive probes, sent at a high granularity, may contribute to an undesirable amount of high priority traffic within a multi-node system.

As will be explained in more detail below, this disclosure describes techniques where a node may use cues from these link level keep-alive protocols (e.g., detections of a link failure between two nodes) to flag errors in TCP sockets operating on the nodes. Both TCP keep-alive protocols and link level heartbeat protocols may be run at the same time. Since link level heartbeat protocols typically run at a high granularity, TCP socket failures caused by node failures at the link level may be detected in a desirable amount of time. Therefore, the multi-node system may be configured to send TCP keep-alives probes less frequently, while still maintaining a desired response time for detecting failures. In addition, the amount of high priority traffic within the multi-node system may be reduced, as TCP keep-alive probes are sent less frequently.

As shown in FIG. 3, SCCs 122 may generate sockets 320A-320B (collectively, "sockets 320") over which applications 310 may communicate with each other. Virtual connections 360 show socket connections between applications 310A running on SCC 122A and applications 310B running on SCC 122B. Virtual connections 362 show socket connections between applications 310A running on SCC 122A and one or more of LCCs 128. In reality, the data sent through such socket connections originates from and is received by applications, where the applications pass messages containing the data into respective kernels 314 via kernel calls, which in turn process the data with an internal TCP network stack so as to create and maintain sockets 320 (socket data structures) and ultimately communicate the as TCP packets across physical communication links 370 (e.g., high-speed internal Ethernet links). It should also be understood that TCP sockets may also be established between two routers, such as multi-chassis router 4 and edge router 5A or 5B of FIG. 1.

One or more routing protocols implemented by applications 310 may establish peer routing sessions with other routers and/or nodes and, by way of these network communication sessions, exchange routing messages. As such, an operating system executing within kernel space 314 of SCCs 122 may implement kernel-level processes for handling data at various layers of the open systems interconnection (OSI) networking model, shown as protocol stacks 322A-322B (collectively, "protocol stacks 322"). Protocol stacks 322 may provide an API by which an application 310 creates sockets 320 and establishes, for example, TCP/IP-based communication sessions for sending and receiving routing messages for each of socket 320.

Sockets 320 are logical constructs having data structures (e.g., the 5-tuple) and state data (e.g., error flags) maintained by protocol stacks 322 and may be viewed as acting as interfaces between applications 310 and protocol stacks 322. For instance, sockets 320 may include one or more data structures that define data relating to one or communication sessions, such as a file descriptor of a socket, a thread identifier of the socket, an active/backup state of the socket, and a pointer to a TCP socket within protocol stacks 322.

Protocol stacks 322 may maintain error flags that indicate if there are any errors on one of sockets 320 that may require remediation. As discussed above, protocol stacks 322 may execute a TCP keep-alive protocol, whereby TCP keep-alive probes are sent over sockets 320 to determine whether or not TCP socket connections are still available. TCP socket connections may fail for many reasons, including communication link failure (e.g., communication link 370), too much traffic, a software failure, node failure, etc. In one example, protocol stack 322A of SCC 122A may send a TCP keep-alive probe for a socket 320 established between an application 310A of SCC 122A and an application 310B of SCC 122B. If protocol stack 322B of SCC 122B does not send an acknowledgment of a TCP keep-alive probe back to SCC 122A, protocol stack 322A may flag an error (e.g., write bits to memory that may be checked by protocol stack 322A) on the corresponding socket 320A. The next time application 310A attempts to perform a read or write process over one of sockets 320A, protocol stack 322A will check for any flagged errors. If there are errors, protocol stack 322A may then remediate the affected TCP socket. Remediation may include terminating the TCP socket, restarting the TCP socket, and/or performing a failover process. Examples of failover processes will be discussed in more detail below.

As discussed above, when a multi-node system, such as multi-chassis router 4, includes many nodes that may open multiple TCP sockets, the amount of traffic created by their respective TCP keep-alive probes may be undesirable. Also, to ensure quicker remediation of failed TCP sockets, it may be beneficial to increase the frequency of TCP keep-alive probes. This increased frequency also contributes to an undesirable increase in traffic in the multi-node system. In accordance with techniques of this disclosure, nodes within a multi-node system may be configured to detect link level failures using a link level keep-alive protocol, and then flag TCP sockets using such failed links with an error.

Each node of a multi-node system may only have a limited number of links over which a link level keep-alive protocol is run. However, each node may open a large multiple of TCP connections. As such, the amount of traffic created by a link level keep-alive protocol is predictably smaller than the potential amount of traffic from TCP keep-alive protocols. Furthermore, link failures are a common source of TCP socket errors. As such, in some instances TCP keep-alive protocols and link level keep-alive protocols may identify the same error. Also, link level keep-alive protocols typically run at a faster frequency than TCP keep-alive protocols. As such, using the techniques of this disclosure, link level keep-alive protocols may be used to flag errors on TCP sockets. Accordingly, TCP keep-alive protocols may be set to run at a lower frequency than the link level keep-alive protocols.

In the example FIG. 3, SCCs 122 may execute error modules 324A-324B (collectively, "error modules 324"). As shown in FIG. 3, error modules 324 may be configured to communicate with BFD daemons 318. This is just one example, error modules 324 may be configured to communicate with any type of link level keep-alive protocol. In one example, BFD 318A may detect an error on a link 370 between SCC 122A and LCC 128A. Error module 324A may be configured to read this error and determine the source IP address (e.g., the IP address of SCC 122A) and the destination IP address (e.g., the IP address of LCC 128A) affected by the detected link failure.

Error module 324A may then access a table of TCP sockets 320A maintained by protocol stack 322A. As discussed above, TCP sockets may be defined by a 5-tuple, which includes a source IP address, a source port number, a destination (e.g., a destination node) IP address, a destination port number, and a protocol (e.g., TCP). Based on the 5-tuples of the various TCP sockets 320A, error module 324A may determine which of the TCP sockets 320A are communicating to/from the source IP address and destination IP address affected by the detected link level failure. Once the affected TCP sockets are identified, error module 324A may write information to the protocol stack 322A identifying the affected TCP sockets. In some examples, error module 324A may write an error flag, such as was described above for TCP keep-alives, to each of the TCP sockets affected by the link level failure. In other examples, error module 324A may write information identifying the source IP address and destination IP address having the detected link failure to protocol stack 322A. In this example, protocol stack 322A may be configured to determine the TCP sockets affected by the identified IP addresses and flag the TCP sockets with errors.

No matter how the errors are flagged, the next time one of applications 310A attempts to perform a read and/or write action over the TCP socket that has been flagged with an error, protocol stack 322A will read the error flag and perform a remediation on the affected TCP socket. As discussed above, remediation of the TCP socket may include terminating the TCP socket, restarting the TCP socket, and/or performing a failover process for the applications 310A communicating over the TCP socket.

As one example of remediation, error module 324A may detect a link failure (e.g., from BFD daemon 318A) between SCC 122A and LCC 128A. Error module 324A may determine each of TCP sockets 320A that are communicating over the affected link and write an error flag to protocol stack 322A. Protocol stack 322A may detect when one of applications 310A attempts to read and/or write data over the one of TCP sockets 320A having the flagged error. In this example, protocol stack 322A may terminate the TCP sockets 320A having the error. Applications 310A may then restart the TCP sockets that were terminated. Since there is a link failure to LCC 128A, protocol stack 322A may create new TCP sockets 320A to another of LCCs 128 (e.g., LCC 128B).

As another example, SCC 122A and edge router 5A (FIG. 1) may exchange routing messages over a TCP sockets in accordance with a routing protocol, such as a BGP daemon of applications 310. In this example, SCC 122A may be considered the primary routing processor of multi-chassis router 4. When multi-chassis router 4 receives a routing message from edge router 5A, the routing message is internally forwarded to SCC 122A for processing. Before being fully processed by SCC 122A and acknowledged, however, the received routing message may be replicated and sent to a backup routing processor (e.g., SCC 122B) of multi-chassis router 4. Similarly, when multi-chassis router 4 outputs routing messages to edge router 5A via the TCP socket, the routing message to be sent is replicated and sent to SCC 122B. Upon receiving inbound or outbound routing messages, SCC 122B updates state information for its TCP socket 320B corresponding to the TCP socket 320A of SCC 122A used for the communication session. In particular, SCC 122A may send replicated data to SCC 122B before the data is processed by a transport layer for the socket on SCC 122A. For example, data may be replicated and communicated to SCC 122B before outbound data is packaged into a TCP packet (when sending data) by the transport layer or before an inbound packet is unpacked from a TCP packet (when receiving data) by the transport layer.

In other examples, SCC 122A may be configured to run a link level keep-alive protocol (e.g., BFD) between SCC 122A and edge router 5A. SCC 122A may be part of a multi-chassis system or a standalone single-chassis system. SCC 122A may use the link level keep-alive protocol to detect link or node failures between SCC 122A and edge router 5A. SCC 122A may use the detected link or node failure to write a socket error for any TCP connection used by processes between SCC 122A and edge router 5A.

In one example of the disclosure, error module 324A of SCC 122B may detect a node failure at SCC 122A using BFD daemon 318. Error module 324B may identify the affected TCP sockets 320B and write an error to protocol stack 322B. In this example, the affected TCP sockets 320B may be TCP sockets established so that SCC 122B may replicate the functions of SCC 122A. Since, such TCP sockets have failed, this may trigger SCC 122B to begin a failover process. That is, in this situation, the remediation process performed by SCC 122B may be a failover.

In the event of a failover from SCC 122A to SCC 122B due to, for example, failure of the SCC 122A, the communication sessions are maintained and SCC 122B transparently takes control of the communication sessions. Data communications sent or received by applications 310 associated with the communication sessions is transparently replicated from the SCC 122A to SCC 122B to any switchover event. SCC 122B constructs and maintains replicated communication sessions (e.g., TCP sockets) so as to mimic the communication sessions of SCC 122A.

In general, as described above, SCCs 122 controls the operation of LCCs 128. FIG. 3 shows LCC 128A in detail. Each of LCCs 128 in multi-chassis router 4 may be configured in the same manner. In addition, though not shown, each of LCCs 128 may be configured to perform the same functions as error modules 324. That is, LCCs 128, in addition to SCCs 122, may be configured to determine link level failures, determine TCP sockets affected by the link level failures, and write errors to respective TCP protocol stacks indicating errors for each of the TCP sockets.

Each of LCCs 128 may provide an operating environment for a respective one of kernels 364A-364D ("kernels 364"). To ensure compatibility, kernels 364 may be substantially similar to kernels 314 in SCCs 122. Likewise, each of LCCs 128 may provide an operating environment for a respective one of user spaces 362A-362D ("user spaces 362"). In accordance with the techniques described herein, LCCs 128 may include BFD daemon 354A-354D (collectively, "BFD daemons 354") that may operate in a similar manner to BFD daemons 314. Furthermore, LCCs 128 may execute one or more applications 352A-352D (collectively, "applications 352") in user spaces 362. Applications 352 may communicate with other nodes in multi-chassis router 4 over a TCP socket.

LCCs 128 receive and send data packets via interfaces of IFCs 134A1-134AN. Each of LCCs 128 its associated sets of IFCs 134 may reside on a separate line card (not shown) for multi-chassis router 4. Example line cards include flexible programmable integrated circuit (PIC) concentrators (FPCs), dense port concentrators (DPCs), and modular port concentrators (MPCs). Each of IFCs 134 may include interfaces for various combinations of layer two (L2) technologies, including Ethernet, Gigabit Ethernet (GigE), and Synchronous Optical Networking (SONET) interfaces. In various aspects, each of LCCs 128 may comprise more or fewer IFCs. Communication links 370 provides a high-speed interconnect for forwarding incoming data packets to the selected one of LCCs 128 for output over a network.

LCCs 128 process packets by performing a series of operations on each packet over respective internal packet processing paths as the packets traverse the internal architecture of multi-chassis router 4. The result of packet processing determines the way a packet is forwarded or otherwise processed by PFEs 132 from its input interface on one of the sets of IFCs 134 to its output interface on one of the sets of IFCs 134.

LCCs 128 may include one or more PFEs 132. PFEs 132 may include application-specific integrated circuit-based packet processors ("ASICs") or any packet forwarding engine that execute the techniques described in this disclosure. PFEs may include one or more programmable application-specific integrated circuits having a key engine that executes microcode (or "microinstructions") to control and apply fixed hardware components of PFEs 132 to process packet "keys." A packet key includes packet fields and other parameters that determine a flow of packet processing for the packet along an internal processing path. A key engine includes a key buffer to store packet field data for corresponding packets that the key engine is currently processing. The Key buffer may also provide limited writable memory to which elements of the internal processing path may write to pass messages accessible by future elements.

An internal processing path of PFEs 132 may include programmable, executable microcode and fixed hardware components that determine the packet processing actions and other operations performed by the key engine. PFEs 132 may store executable instructions of processing path in computer-readable storage media, such as static random-access memory (SRAM).

In some examples, the processing path includes a next hop data structure to initiate processing. At the end of each processing step by the key engine, the result is a next hop that may specify additional processing or the termination of processing, for instance. In addition, next hops may specify one or more functions to be executed by the key engine and/or one or more hardware elements to be applied (e.g., policers). The Key engine may be associated with a result (or "lookup") buffer (not shown) that stores results for executing next hops. For example, the key engine may execute a lookup specified by a list of next hops and store the result of the lookup to the associated result buffer. The contents of a result buffer may affect the actions of the next hop.

LCCs 128, in combination with other components of multi-chassis router 4, implements forwarding plane 252 (also known as a "data plane") functionality to establish session master/standby nodes, detect connectivity status of peer nodes, and convert to a session master node upon the detection that a current session master node is down. Forwarding plane 252 determines data packet forwarding through multi-chassis router 4, applies services, rate limits packet flows, filters packets, and otherwise processes the packets using service objects and lookup data installed by control plane 250 to forwarding plane 252. Although FIG. 3 illustrates only LCC 128A, each of LCCs 128 of comprises similar modules that perform substantially similar functionality.

Forwarding component microprocessor 356A-356D (collectively, "FC microprocessors 256") manages PFEs 132 and executes programming interfaces 350A-350D (collectively, "programming interfaces 350") to provide an interface for/to SCCs 122. Programming interfaces 350 may comprise one or more user- or kernel-level libraries, programs, toolkits, application programming interfaces (APIs) and may communicate control and data messages to LCCs 128 via internal communication link 370 using TCP sockets, for example. FC microprocessors 356 may execute microkernels 364 to provide an operating environment for interfaces. Programming interfaces 350 receives messages from SCCs 122 directing LCCs 128 to configure IFCs 134.

Figure 4:
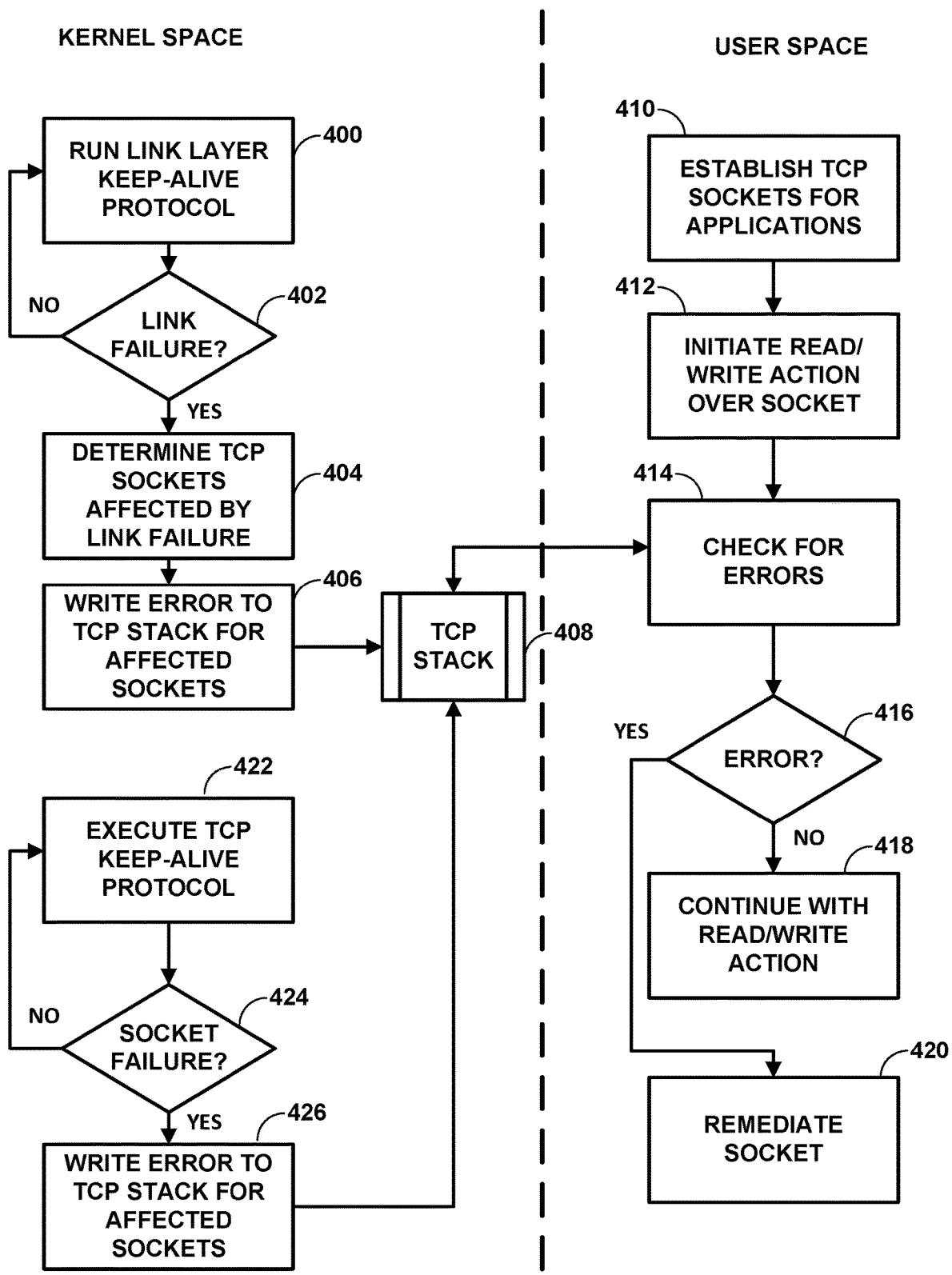
FIG. 4 is a flowchart illustrating example operation of the multi-chassis router.

FIG. 4 is a flowchart illustrating an example method of the disclosure, the techniques of FIG. 4 may be implemented by any node (e.g., processor) of a multi-node system (e.g., multi-chassis router 4) or any node of a single-node system. The example of FIG. 4 will be described with reference to micro-processor 300A of SCC 122A shown in FIG. 3. However, it should be understood that the techniques of FIG. 4 may be performed by any of SCCs 122, LCCs 128, or any type of node of multi-node system. Also, FIG. 4 shows one example of a division of processes between kernel space processes and user space processes. In this example, processes to the left of the dashed line may be performed in kernel space, while processes to the right of the dashed line may be performed in user space. However, this is just one example, and the techniques of FIG. 4 may be divided in any way between the kernel space and the user space.

Micro-processor 300A may be configured to run a link layer keep-alive protocol between at least a first node (e.g., SCC 122A of FIG. 3) and a second node (e.g., LCC 128A of FIG. 3) of a multi-node system (e.g., multi-chassis router 4) (400). In some examples, the first node and the second node may be two different routers. For example, the first node may multi-chassis router 4 of FIG. 1 and the second node may be edge router 5A of FIG. 1. As described above, the link level keep-alive protocol may be any protocol that may be used to detect the failure of a communication link (e.g., Ethernet) between two nodes. Examples of link level keep-alive protocols include BFD protocol, TNP, a trip keep-alive protocol, a system heartbeat, etc.

Using the link level keep-alive protocol, micro-processor 300A may be configured to determine if there is a failure of a link between the first node and the second node (402). If there is no detected failure, micro-processor 300A may continue to run the link layer keep-alive protocol (400). If micro-processor 300A detects a failure between the first node and the second, micro-processor 300A may be configured to determine one or more TCP sockets of a plurality of TCP sockets on the first node that are communicating over the link between the first node and the second node (404).

In order to determine the one or more TCP sockets affected by the link failure, may be configured to analyze the 5-tuples that define the TCP sockets. Micro-processor 300A may first determine a first IP address for the first node and determine a second IP address for the second node. Micro-processor 300A may then determine the one or more TCP sockets that are communicating over the link based on a respective 5-tuple of the one or more TCP sockets having the first IP address or the second IP address.

Micro-processor 300A may then write information to a TCP stack (408) for the affected TCP sockets (406). The information is some form of indication that the determined one or more TCP sockets have an error. In one example, micro-processor 300A may be configured to write an error flag for each of the determined one or more TCP sockets.

Contemporaneously with running the link layer keep-alive protocol, micro-processor 300A may be configured to establish TCP sockets for one or more applications (410). When executing such applications, micro-processor 300A may initiate read and/or write actions over the TCP sockets (412). In response to the initiation of a read/write action over the TCP socket, micro-processor 300A may check for errors (414) in the TCP stack. If there are no errors, micro-processor 300A may continue with the read/write action (418). If there are errors flagged in the TCP stack, micro-processor 300A may then proceed to remediate the TCP socket indicated as having an error by the information written to the TCP stack (420).

In this context remediating the TCP socket may involve one or more timely failover or error handling procedures. For example, in response to the error written to TCP stack 408, micro-processor 300A may then take actions such as promoting itself to master or failing over to a backup node (e.g., SCC 122B). As another example, if one of applications 352A executing on LCC 128A fails over to a different application executing on LCC 128B, micro-processor 300A may terminate the TCP socket connections with LCC 128A and initiates a TCP connection with the new application executing on LCC 128B. The techniques of this disclosure provide for a quicker detection of application-level failures (e.g., TCP sockets) using link-level keep-alive protocols, so that corrective action may be taken.

In one example, the first node is a primary routing processor and the second node is a backup routing processor. In this example, remediating the determined one or more TCP sockets in response to the information comprises performing a failover process such that processes communicating over the determined one or more TCP sockets are transferred to the backup routing processor.

In another example, the first node is a routing processor and the second node is a first packet forwarding engine. In this example, remediating the determined one or more TCP sockets in response to the information comprises terminating processes communicating over the determined one or more TCP sockets, and restarting the processes over TCP sockets between the routing processor and a second packet forwarding engine.

Micro-processor 300A may be further configured to execute a TCP keep-alive protocol for each of the plurality of TCP sockets on the first node contemporaneously with the link layer keep-alive protocol (422). The TCP keep-alive protocol may operate less frequently than the link layer keep-alive protocol. Based on the TCP keep-alive protocol, micro-processor 300A may determine if there is a socket failure (424). If no, micro-processor 300A continues to execute the TCP keep-alive protocol. If yes, micro-processor 300A write an error to the TCP stack for affected sockets (426).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Various examples have been described. These and other examples are within the scope of the following claims.

What is claimed is:

1. A method comprising:
    detecting, at a first node, a failure of a link between the first node and a second node using a link level keep-alive protocol, wherein the first node and the second node are within a multi-node system;
    determining, at the first node and in response to detecting the failure using the link level keep-alive protocol, one or more transmission control protocol (TCP) sockets of a plurality of TCP sockets on the first node that are communicating over the link between the first node and the second node;
    prior to a read or write action between the first node and the second node being initiated in user space of the first node over a particular TCP socket of the determined one or more TCP sockets, and in response to detecting the failure using the link level keep-alive protocol, writing information accessible to a TCP stack in kernel space of the first node for the determined one or more TCP sockets, the information indicating that the determined one or more TCP sockets have an error;
    reading, at the first node, the information accessible to the TCP stack in response to the read or write action; and
    remediating, at the first node, the particular TCP socket of the determined one or more TCP sockets in response to reading the information.

2. The method of claim 1, wherein the link level keep-alive protocol is one or more of a Bidirectional Forwarding Detection (BFD) protocol, a Trivial Network Protocol (TNP), a trip keep-alive protocol, or a system heartbeat.

3. The method of claim 1, further comprising:
    executing a TCP keep-alive protocol for each of the plurality of TCP sockets on the first node contemporaneously with the link level keep-alive protocol, wherein the TCP keep-alive protocol operates at a lower frequency than the link level keep-alive protocol.

4. The method of claim 1, wherein determining the one or more TCP sockets that are communicating over the link comprises:
    determining a first internet protocol (IP) address for the first node;
    determining a second IP address for the second node; and
    determining the one or more TCP sockets that are communicating over the link based on a respective 5-tuple of the one or more TCP sockets having the first IP address or the second IP address.

5. The method of claim 1, wherein writing information accessible to the TCP stack comprises writing an error flag accessible to the TCP stack for each of the determined one or more TCP sockets.

6. The method of claim 1, wherein the first node is a primary routing processor and wherein the second node is a backup routing processor, and wherein remediating the particular TCP socket of the determined one or more TCP sockets in response to reading the information comprises:
    performing a failover process such that processes communicating over the particular TCP socket of the determined one or more TCP sockets are transferred to the backup routing processor.

7. The method of claim 1, wherein the first node is a routing processor and wherein the second node is a first packet forwarding engine, and wherein remediating the particular TCP socket of the determined one or more TCP sockets in response to reading the information comprises:
    terminating the particular TCP socket of the determined one or more TCP sockets; and
    restarting the particular TCP socket of the determined one or more TCP sockets between the routing processor and a second packet forwarding engine.

8. The method of claim 1, wherein the multi-node system is a router, and wherein the first node and the second node are within the router.

9. The method of claim 1, wherein the multi-node system includes two or more devices, and wherein the first node and the second node are within separate device of the two or more devices.

10. A network device configured as a multi-node system, the network device comprising:
    a first node that includes a primary routing processor; and
    a second node, wherein the first node is configured to:
        detect a failure of a link between the first node and the second node using a link level keep-alive protocol;
        determine, in response to detecting the failure using the link level keep-alive protocol, one or more transmission control protocol (TCP) sockets of a plurality of TCP sockets on the first node that are communicating over the link between the first node and the second node;
        prior to a read or write action between the first node and the second node being initiated in user space of the first node over a particular TCP socket of the determined one or more TCP sockets, and in response to detecting the failure using the link level keep-alive protocol, write information accessible to a TCP stack in kernel space of the first node for the determined one or more TCP sockets, the information indicating that the determined one or more TCP sockets have an error;
        read the information accessible to the TCP stack in response to the read or write action; and
        remediate the particular TCP socket of the determined one or more TCP sockets in response to reading the information.

11. The network device of claim 10, wherein the link level keep-alive protocol is one or more of a Bidirectional Forwarding Detection (BFD) protocol, a Trivial Network Protocol (TNP), a trip keep-alive protocol, or a system heartbeat.

12. The network device of claim 10, wherein the first node is further configured to:
execute a TCP keep-alive protocol for each of the plurality of TCP sockets on the first node contemporaneously with the link level keep-alive protocol, wherein the TCP keep-alive protocol operates at a lower frequency than the link level keep-alive protocol.

13. The network device of claim 10, wherein to determine the one or more TCP sockets that are communicating over the link, the first node is further configured to:
determine a first internet protocol (IP) address for the first node;
determine a second IP address for the second node; and
determine the one or more TCP sockets that are communicating over the link based on a respective 5-tuple of the one or more TCP sockets having the first IP address or the second IP address.

14. The network device of claim 10, wherein to write information accessible to the TCP stack, the first node is further configured to write an error flag accessible to the TCP stack for each of the determined one or more TCP sockets.

15. The network device of claim 10, wherein the second node is a backup routing processor, and wherein to remediate the particular TCP socket of the determined one or more TCP sockets in response to reading the information, the first node is further configured to:
perform a failover process such that processes communicating over the particular TCP socket of the determined one or more TCP sockets are transferred to the backup routing processor of the multi-node system.

16. The network device of claim 10, wherein the second node is a first packet forwarding engine, and wherein to remediate the particular TCP socket of the determined one or more TCP sockets in response to reading the information, the first node is further configured to:
terminate the particular TCP socket of the determined one or more TCP sockets; and
restart the particular TCP socket of the determined one or more TCP sockets between the routing processor and a second packet forwarding engine.

17. A non-transitory computer-readable storage medium comprising instructions for causing a programmable processor to:
detect, at a first node, a failure of a link between the first node and a second node using a link level keep-alive protocol, wherein the first node and the second node are within a multi-node system;
determine, at the first node and in response to detecting the failure using the link level keep-alive protocol, one or more transmission control protocol (TCP) sockets of a plurality of TCP sockets on the first node that are communicating over the link between the first node and the second node;
prior to a read or write action between the first node and the second node being initiated in user space of the first node over a particular TCP socket of the determined one or more TCP sockets, and in response to detecting the failure using the link level keep-alive protocol, write information accessible to a TCP stack in kernel space of the first node for the determined one or more TCP sockets, the information indicating that the determined one or more TCP sockets have an error;
read, at the first node, the information accessible to the TCP stack in response to the read or write action; and
remediate, at the first node, the particular TCP socket of the determined one or more TCP sockets in response to reading the information.

\* \* \* \* \*